(12) United States Patent
Delmar

(10) Patent No.: US 11,648,999 B1
(45) Date of Patent: May 16, 2023

(54) TANDEM SLIDE RULE

(71) Applicant: Stephen A. Delmar, Buckeye, AZ (US)

(72) Inventor: Stephen A. Delmar, Buckeye, AZ (US)

( * ) Notice: Subject to any disclaimer, the term of this patent is extended or adjusted under 35 U.S.C. 154(b) by 29 days.

(21) Appl. No.: 17/535,316

(22) Filed: Nov. 24, 2021

(51) Int. Cl.
*B62D 63/08* (2006.01)
*G01B 3/04* (2006.01)
*B62D 53/06* (2006.01)

(52) U.S. Cl.
CPC ........... *B62D 63/08* (2013.01); *B62D 53/068* (2013.01); *G01B 3/04* (2013.01)

(58) Field of Classification Search
USPC ........... 33/600, 264, 263; 180/209; 280/407; 116/28 R
See application file for complete search history.

(56) References Cited

U.S. PATENT DOCUMENTS

| | | | | | |
|---|---|---|---|---|---|
| 3,191,966 | A * | 6/1965 | Felburn | ................ | B62D 53/068 280/407 |
| 3,859,732 | A * | 1/1975 | Davin | ..................... | G01C 3/22 33/264 |
| 4,257,706 | A * | 3/1981 | Smith | .................... | B60Q 1/484 356/3 |
| 5,040,302 | A * | 8/1991 | Theising | .................. | B60D 1/36 33/645 |
| 5,094,001 | A * | 3/1992 | Fraser | .................. | A01B 69/001 33/624 |
| 5,224,270 | A * | 7/1993 | Burrus | ..................... | B60D 1/36 356/399 |
| 5,678,834 | A * | 10/1997 | Wise | ..................... | B62D 53/068 180/209 |
| 6,354,642 | B1 * | 3/2002 | Haggerty | ............. | B62D 53/068 180/209 |
| 6,651,581 | B2 * | 11/2003 | Gauthier | ................ | B60Q 1/484 116/28 R |
| 6,734,786 | B2 * | 5/2004 | Hoholik | .................. | B62D 15/00 116/28 R |
| 7,040,425 | B2 * | 5/2006 | Hammonds | .............. | B60D 1/36 180/6.48 |
| 7,415,771 | B2 * | 8/2008 | Harrill | .................. | B60G 17/019 340/686.2 |
| 8,978,259 | B1 * | 3/2015 | Stephenson, Jr. | ........ | G01S 17/88 33/286 |

(Continued)

FOREIGN PATENT DOCUMENTS

| | | | | | |
|---|---|---|---|---|---|
| DE | 202007016780 | U1 * | 5/2008 | ............. | B62D 63/06 |
| GB | 2383416 | A * | 6/2003 | ................ | B43L 9/00 |

(Continued)

*Primary Examiner* — Christopher W Fulton
(74) *Attorney, Agent, or Firm* — Allan Watts

(57) ABSTRACT

An apparatus for measuring distance when moving a vehicle, for instance, for measuring how far to move a tractor of a tractor-trailer rig when sliding (e.g., tandem) axles of the trailer, for example, to equalize weight between wheels or axles of the rig. A scale is mounted on the vehicle with (e.g., evenly-spaced) indicia arranged in a line parallel to a forward or reverse direction of the vehicle. The scale is positioned on the vehicle where the driver, while driving the vehicle, can see the scale and can sight past the scale to a stationary visual reference located outside the vehicle (e.g., on the driving surface) to see how far the vehicle has moved. The scale may be on an elongated member which may be attached to the vehicle, for example, to a step below the driver.

20 Claims, 1 Drawing Sheet

(56) References Cited

U.S. PATENT DOCUMENTS

| | | | | |
|---|---|---|---|---|
| 9,032,633 B2* | 5/2015 | Pittman | ................... | B60D 1/36 |
| | | | | 33/264 |
| 2002/0148124 A1* | 10/2002 | Strange | ................... | B60D 1/36 |
| | | | | 33/DIG. 1 |
| 2006/0243508 A1* | 11/2006 | Diehl | ................... | B62D 53/068 |
| | | | | 180/209 |
| 2010/0147614 A1* | 6/2010 | Beimert | ............... | B62D 53/068 |
| | | | | 180/209 |

FOREIGN PATENT DOCUMENTS

| | | | | |
|---|---|---|---|---|
| GB | 2449553 A | * | 11/2008 | ......... B62D 53/0814 |
| WO | WO-9110580 A | * | 7/1991 | ............... B60D 1/36 |

* cited by examiner

TANDEM SLIDE RULE

FIELD THE INVENTION

Various embodiments of this invention relate to devices for measuring distance when moving a vehicle. Particular embodiments, for example, concern devices for measuring how far to move a tractor when sliding (e.g., tandem) axles of a trailer of a tractor-trailer rig or truck.

BACKGROUND OF THE INVENTION

Trailer axles of a tractor-trailer rig can be moved forward or rearward, for example, to adjust the load distribution between the trailer axles and the rear axles of the tractor. This has been done, for example, to even out the load distribution between the trailer and tractor axles. To move the trailer axles, for example, the driver of the truck can pull pins that hold the trailer axles in position, and then move the tractor forward or rearward while the tractor is connected to the trailer and while the brakes on the trailer are set. This slides the trailer relative to its (e.g., tandem) axles and wheels. Once the trailer is properly positioned relative to the axles, the driver can get out of the tractor and walk back and reinsert the pins in different holes to hold the trailer axles in the new position. In the past, however, it has been difficult for the driver to know how far to move the tractor so the pins would engage the desired holes. One solution to the problem was for someone to assist the driver and stand by the trailer axles and signal to the driver to move the tractor until the holes and pins line up. But drivers don't always have someone available to assist. As a result, drivers working alone typically had to guess how far to move the tractor, then set the brakes of the tractor, get out of the cab, walk back to the trailer axles, and see which direction and how far to move the tractor to get the pins to line up with the desired holes. Then the driver would walk pack to the tractor, disengage the brake, move the tractor slightly, and walk back to the trailer axles again. This often took several iterations before the driver was able to engage the pins in the desired holes.

Room for improvement exists in the way drivers slide trailer axles. For example, potential for benefit exists in the number of iterations or amount of time it takes for a driver to reposition or slide trailer axles. Potential for benefit exists for apparatuses that make sliding trailer axles easier or that take fewer iterations, for example, when being done just by the driver without any assistance. Further, other situations exist where more accurately measuring the distance that a vehicle has moved may be beneficial. Examples include when hitching a trailer or when precisely positioning a vehicle or trailer. Other examples may be apparent to a person of skill in the art. Potential for benefit exists in these and other areas that may be apparent to a person of skill in the art having studied this document.

SUMMARY OF PARTICULAR EMBODIMENTS OF THE INVENTION

Various embodiments are or include an apparatus for measuring distance when moving a vehicle, and in particular embodiments, an apparatus for measuring how far to move a tractor when sliding (e.g., tandem) axles of a trailer of a tractor-trailer rig, as examples. Needs or potential for improvement exist in such apparatuses and in the way the distance that a vehicle has moved is determined or measured. Further, needs or potential for improvement exist in apparatuses and methods for moving or sliding (e.g., tandem) trailer axles. For instance, potential for improvement exists in the number of iterations or amount of time it takes for a driver to slide (e.g., tandem) trailer axles. Further, needs or potential for improvement or benefit exist in these and other areas that may be apparent to a person of skill in the art having studied this document.

Specific embodiments include various apparatuses for measuring distance when moving a vehicle, for example, in a forward or reverse direction. In a number of embodiments, for instance, the apparatus includes a scale, for example, that is mounted on the vehicle while the apparatus is in use. Further, in various embodiments, the scale includes multiple (e.g., evenly-spaced) indicia, for example, arranged in a line. Still further, in a number of embodiments, when the apparatus is in use, the line is substantially parallel to the forward or reverse direction of the vehicle, for example, when the vehicle is traveling in a straight line. Even further, in various embodiments, the scale is positioned on the vehicle where the driver, while driving the vehicle, can see the scale, and can sight past the scale to a stationary visual reference located outside the vehicle to see how far the vehicle has moved.

In various embodiments (e.g., when the apparatus is in use), the scale is located on a step of the vehicle, below the driver, or both. Further, in some embodiments, the apparatus is or includes an elongated member. Still further, in particular embodiments, the scale is located on the elongated member. Even further, in some embodiments, when the apparatus is in use, the elongated member is attached to the vehicle. Further still, in a number of embodiments, the elongated member has a longest overall dimension (i.e., of the elongated member) and the longest overall dimension is at least four times any overall dimension of the elongated member that is perpendicular to the longest overall dimension of the elongated member. Even further still, in some embodiments (e.g., when the apparatus is in use), the longest overall dimension of the elongated member is substantially parallel to the forward or reverse direction of the vehicle, for example, when the vehicle is traveling in a straight line. Moreover, in particular such embodiments (e.g., when the apparatus is in use), the elongated member is attached to a step of the vehicle, for example, below the driver. Furthermore, in certain embodiments, the longest overall dimension of the elongated member is at least ten times any overall dimension of the elongated member that is perpendicular to the longest overall dimension of the elongated member.

In a number of embodiments, the scale is positioned on the vehicle such that the driver, while driving the vehicle, can see the scale through a side window of the vehicle. In some embodiments, however, the scale is positioned on the vehicle such that the driver, while driving the vehicle, can see the scale by opening a door of the vehicle. Further, in various embodiments, the scale is positioned (e.g., on the vehicle) below the driver, and when the diver is driving the vehicle, the stationary visual reference is located on the driving surface. Still further, in a number of embodiments, the driver (e.g., while driving the vehicle) can sight past the scale to the stationary visual reference on the driving surface to see how far the vehicle has moved. Even further, in particular embodiments, the apparatus includes the stationary visual reference. For example, in some embodiments, the stationary visual reference includes an object (e.g., carried on the vehicle), for instance, that the driver places on the driving surface before using the apparatus to see how far the vehicle has moved.

In some embodiments, for example, the vehicle is a tractor, for instance, of a tractor-trailer rig. Further, in some embodiments, the apparatus is used to measure how far to move the tractor, for example, when sliding (e.g., tandem) axles of the trailer. Still further, in some embodiments, the indicia are spaced a first distance apart. Even further, in a number of embodiments, the trailer has slider rails with locking holes for locking the axles and the locking holes are spaced a second distance apart. Further still, in some embodiments, the second distance is a whole-number multiple of the first distance. Even further still, in particular embodiments, the whole number is between 1 and 10, for example.

Various specific embodiments are or include an apparatus for measuring how far to move a tractor when sliding (e.g., tandem) axles of a trailer of a tractor-trailer rig. In a number of embodiments, for example, the apparatus includes an elongated member that includes a scale that includes multiple (e.g., evenly-spaced) indicia, for example, arranged in a line. Further, in various embodiments, the elongated member has a longest overall dimension (i.e., of the elongated member), and the longest overall dimension (i.e., of the elongated member) is at least four times any overall dimension of the elongated member that is perpendicular to the longest overall dimension of the elongated member. Still further, in a number of embodiments (e.g., when the apparatus is in use), the elongated member is attached to the tractor, and (e.g., when the apparatus is in use), the elongated member is positioned on the tractor where the driver, while driving the tractor, can see the scale, and can sight past the scale to a stationary visual reference located outside the tractor to see how far the tractor has moved.

In some embodiments, for example, the apparatus further includes instructions to attach the elongated member to the tractor, for example, to attach the elongated member to a step on the tractor. Further, some embodiments include instructions to use the apparatus to measure how far to move the tractor, for example, when sliding the (e.g., tandem) axles of the trailer of the tractor-trailer rig. Further still, in some such embodiments, the elongated member is positioned on the tractor such that the driver, while driving the tractor, can see the scale by opening a door of the tractor. Still further, in various embodiments, the elongated member is positioned on the tractor below the driver (i.e., when the diver is driving the tractor), the stationary visual reference is located on the driving surface, and the driver, while driving the tractor, can sight past the scale to the stationary visual reference on the driving surface to see how far the tractor has moved. Even further, in certain embodiments, the apparatus includes the stationary visual reference. For example, in particular embodiments, the stationary visual reference includes an object carried on the tractor, for example, that the driver places on the driving surface before using the apparatus to see how far the tractor has moved. Even further still, in certain embodiments, the elongated member, the object, or both, are configured for the object to be carried on the tractor within the elongated member. In addition, various other embodiments of the invention are also described herein, and other benefits of certain embodiments are described herein or may be apparent to a person of skill in this area of technology.

Figure 1:
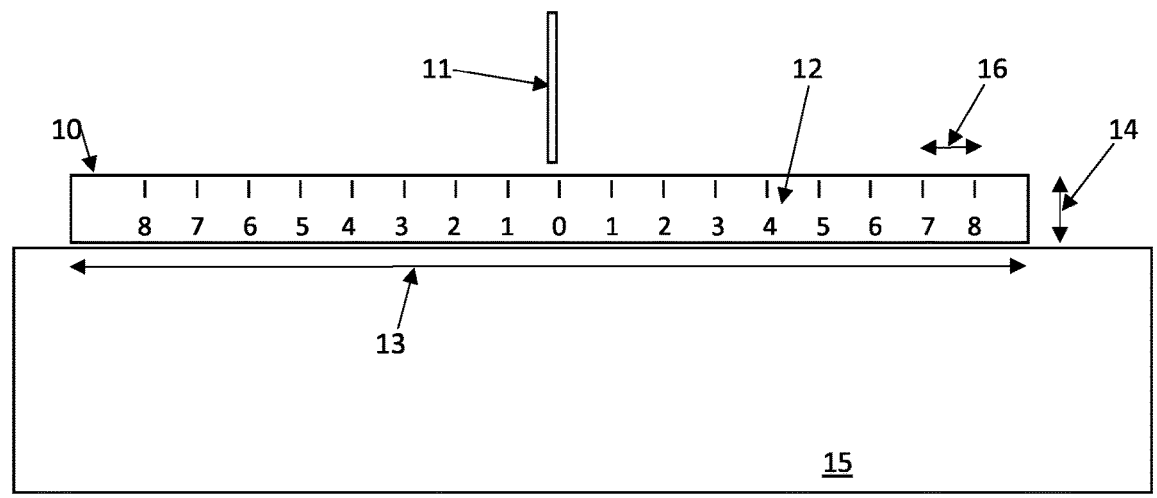
FIG. 1 is a top view of a scale on an elongated member attached to the step of a vehicle showing the driver's view of an example of an apparatus for measuring distance when moving a vehicle or an apparatus for measuring how far to move a tractor when sliding axles of a trailer of a tractor-trailer rig.

The drawings provided herewith illustrate, among other things, examples of certain aspects of particular embodiments. Other embodiments may differ. Various embodiments may include aspects shown in the drawings, described in the specification (including the claims), known in the art, or a combination thereof, as examples.

DETAILED DESCRIPTION OF EXAMPLES OF EMBODIMENTS

Figure 2:
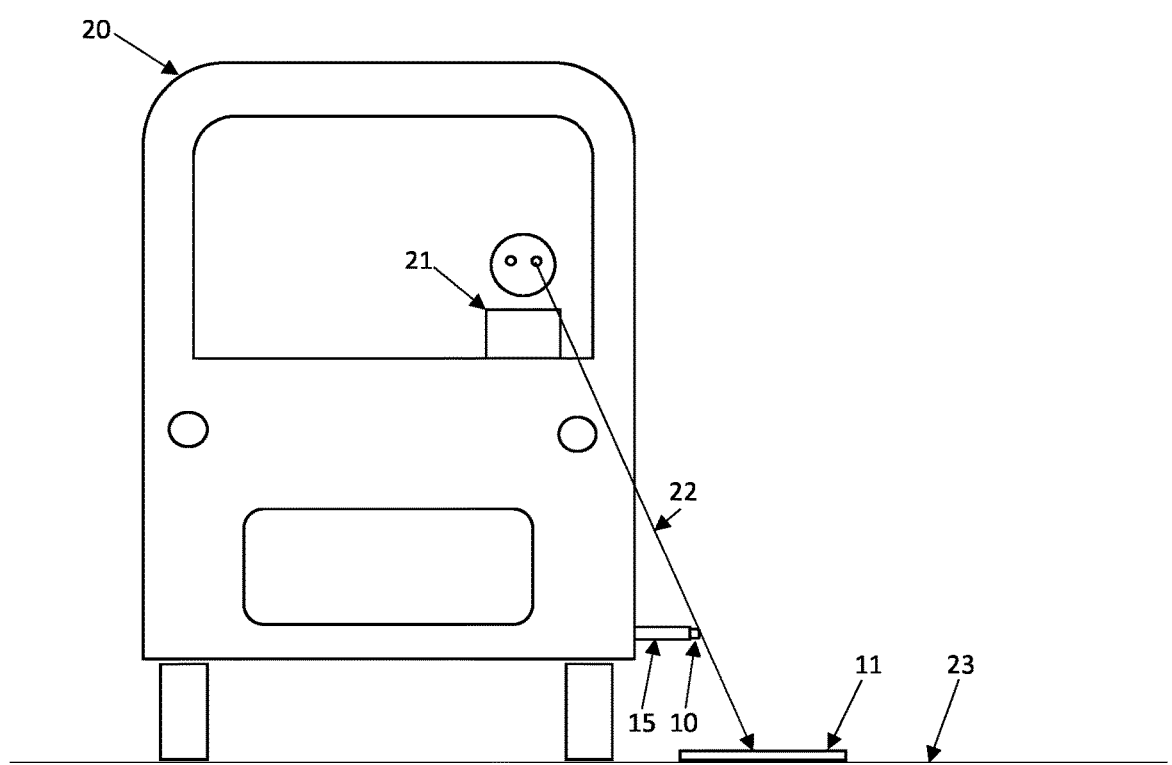
FIG. 2 is a front view of an example of a vehicle or tractor showing a driver of a vehicle sighting past the elongated member of FIG. 1 to use the example of the apparatus to measure how far to move the vehicle or tractor, for instance, when sliding the (e.g., tandem) axles of the trailer of the tractor-trailer rig.

This patent application describes, among other things, examples of certain embodiments, and certain aspects thereof. Other embodiments may differ from the particular examples described in detail herein. Various embodiments are or concern apparatuses for measuring distance, for instance, when moving a vehicle, for example, in a forward or reverse direction. Ruler or elongated member 10 shown in FIG. 1 is an example of such an apparatus. Ruler, elongated member, or apparatus 10 includes scale 12, that is printed or marked on ruler or elongated member 10, as examples. As shown in FIG. 2, ruler, elongated member, or apparatus 10 is mounted on vehicle 20, at least while the apparatus is in use. In some embodiments, ruler, elongated member, or apparatus 10 is mounted on vehicle 20 at all times and is just used when needed. Further, in the embodiment illustrated, scale 12 includes multiple evenly-spaced indicia. In the embodiment shown, these indicia include evenly-spaced lines and sequential numbers or integers, for example, arranged in a line. In this example, the evenly-spaced lines (i.e., shown above the numbers in FIG. 1) are arranged in such a line. Still further, in this example, the numbers or integers of the indicia of scale 12 are also arranged in such a line. Even further, both such lines (i.e., for the evenly-spaced lines and for the numbers or integers) are substantially parallel to each other and are substantially parallel to the forward or reverse direction (i.e., depicted by double-headed arrow 13 shown in FIG. 1) of the vehicle (e.g., 20). As used herein, "substantially parallel" means parallel to within plus or minus 10 degrees unless indicated otherwise. Even further still, where "substantially parallel" is used herein, in various other embodiments, the two (e.g., lines) may be parallel to within 1, 2, 3, 4, 5, 6, 7, 8, 9, 12, 15, 20, 25, or 30 degrees, as other examples. Moreover, in a number of embodiments, when the apparatus (e.g., 10) is in use (i.e., in use to measure distance that the vehicle has moved), the line (i.e., that the indicia are arranged in) is substantially parallel to the forward or reverse direction of the vehicle, for example, when the vehicle is traveling in a straight line (i.e., with the steering or front wheels of the vehicle pointed straight). In FIG. 1, double-headed arrow 13 illustrates the forward or reverse direction of the vehicle, for example, when the vehicle is traveling in a straight line.

In the embodiment illustrated, the indicia of scale 12 includes the integer or number 0 (zero), which is located at or near the middle of scale 12. As used herein, "near" means to within plus or minus 15 percent [i.e., in this case, of the length of the longest overall dimension (e.g., illustrated by double-headed arrow 13) of the elongated member (e.g., 10)]. Successive integers or numbers, in either direction (i.e., forward or reverse), increase sequentially from 0 to 8. Driver 21, in the embodiment illustrated, may initially select or locate stationary visual reference 11 at or near the 0 indicia, and may then move (i.e., drive) vehicle 20 the desired (e.g., short) distance in either the forward or reverse direction. In other embodiments, however, the integers or numbers may extend sequentially from one end of the scale to the other, for example, from 0 to 16. In some embodiments, the driver (e.g., 21) may initially select or locate the stationary visual reference (e.g., 11) somewhere in line of sight with the scale (e.g., 12) and may count indicia or add or subtract indicia to determine how far to move the vehicle or tractor (e.g., 20) to obtain the desired distance in either the forward or reverse direction.

In various embodiments, the scale (e.g., 12) is positioned on the vehicle (e.g., 20) where the driver (e.g., 21), while driving the vehicle (e.g., while positioned approximately as shown in FIG. 2), can see the scale and can sight past the scale to a stationary visual reference (e.g., 11) located outside the vehicle to see how far the vehicle has moved. FIG. 2 illustrates an example where apparatus, elongated member, or ruler 10 is positioned on vehicle 20 where driver 21, while driving vehicle 20, can sight past the scale (e.g., scale 12 shown in FIG. 1, of apparatus, elongated member, or ruler 10 shown in both FIG. 1 and FIG. 2) to stationary visual reference 11. In this example, stationary visual reference 11 is located outside vehicle 20. In this manner, driver 21 can read scale 12 to see how far vehicle 20 has moved. In FIG. 2, driver 21 sights along line of sight 22. Further, FIG. 1 is an example of what driver 21 sees (i.e., including scale 12) when looking down at apparatus, elongated member, or ruler 10, and at stationary visual reference 11, while driving vehicle 20 and while using apparatus, elongated member, or ruler 10 to measure distance that vehicle 20 has moved. In this context, "driving" may mean inching vehicle 20 forward or backward a short distance at a low speed as opposed to typical distances covered and speeds when traveling on a highway. In this context, "driving" means that driver 21 is in a position suitable to reach the pedals of vehicle 20 (for example, sitting in the driver's seat), for instance, as shown in FIG. 2. The words "move", "moving", and "moved" are also used herein and may also mean inching (e.g., vehicle 20) forward or backward a short distance at a low speed.

In the embodiment shown in FIGS. 1 and 2, when apparatus, elongated member, or ruler 10 is in use (i.e., in use to measure distance that vehicle 20 has moved), scale 12 is located on step 15 of vehicle 20 below driver 21. As used herein, a scale is considered to be "on" a component (e.g., step 15) if the scale is printed or marked directly on the component (e.g., step 15, which is the case in some embodiments) or if the scale is printed or marked on a member (e.g., ruler or elongated member 10) that is placed on or attached to (e.g., on top of or beside) the component (e.g., step 15, for instance, as shown), as examples. In the embodiment illustrated, for instance, ruler or elongated member 10 may be attached to step 15 with adhesive, one or more fasteners (e.g., screws, bolts, rivets, or a combination thereof), one or more clamps, one or more magnets, zip ties, or a combination thereof, as examples. Various fastening or attachment mechanisms may be used in different embodiments.

In various embodiments, the apparatus includes an elongated member. Ruler 10 is an example of an elongated member where the scale (e.g., 12 shown in FIG. 1) is located on the elongated member (e.g., 10). Even further, in some embodiments (e.g., at least when the apparatus is in use), the elongated member (e.g., 10) is attached to the vehicle (e.g., to step 15 as shown in FIGS. 1 and 2). Further still, in the embodiment illustrated, elongated member 10 has a longest overall dimension (i.e., overall dimension of the elongated member). An example of such a longest overall dimension is illustrated in FIG. 1 with double-headed arrow 13. In a number of embodiments, the longest overall dimension (e.g., 13) is at least four times any (e.g., the greatest) overall dimension of the elongated member (e.g., 10) that is perpendicular to the longest overall dimension (i.e., of the elongated member). Double-headed arrow 14 shown in FIG. 1 is an example of such an overall dimension of the elongated member that is perpendicular to the longest overall dimension (e.g., 13) of elongated member 10. In other embodiments, the longest overall dimension (e.g., 13, or corresponding thereto) of the elongated member (e.g., 10, or corresponding thereto) is at least 2, 3, 5, 6, 7, 8, 9, 10, 12, 15, 20, 25, 30, 35, 40, 45, or 50 times any (e.g., the greatest) overall dimension (e.g., dimension 14, or corresponding thereto) of the elongated member that is perpendicular to the longest overall dimension (i.e., of the elongated member), as examples. In certain embodiments, for example, the longest overall dimension (e.g., 13) of the elongated member is about 18 inches, and an overall dimension (e.g., 14) of the elongated member (e.g., 10) that is perpendicular to the longest overall dimension (e.g., 13) of the elongated member is about ½ inch. As used herein, "about", unless indicated otherwise, means plus or minus ten percent. In other embodiments, for other examples, the longest overall dimension (e.g., 13) of the elongated member (e.g., 10) is about 12, 16, 20, 24, 30, or 36 inches, as other examples, and the overall dimension of the elongated member that is perpendicular to the longest overall dimension of the elongated member (e.g., 14 shown in FIG. 1) may be, in various other embodiments, about ⅜, ⁷⁄₁₆, ⁹⁄₁₆, ⅝, ¾, ⅞, 1, 1⅛, 1¼, or 1½ inches, as other examples. In the embodiment shown, at least when the apparatus is in use (i.e., being used to measure distance that vehicle 20 has moved), the longest overall dimension (e.g., 13) of the elongated member (e.g., 10) is substantially parallel to (i.e., in the embodiment illustrated, double-headed arrow 13 is substantially parallel to) the forward or reverse direction of vehicle 20, for example, when vehicle 20 is traveling in a straight line. Moreover, in the embodiment shown, at least when the apparatus is in use, the elongated member (e.g., 10) is attached to step 15 of vehicle 20 below driver 21.

In a number of embodiments (e.g., when the apparatus is in use), the scale (e.g., 12 shown in FIG. 1) is positioned on the vehicle (e.g., 20) such that the driver (e.g., 21), while driving the vehicle (e.g., as shown), can see the scale through a side window of the vehicle (e.g., in the door of the vehicle). Although not shown in FIG. 2, in a number of embodiments, the driver (e.g., 20), may lean over, turn his or her head, or even lean out the window to see the scale (e.g., 12, for instance, on elongated member 10), in various embodiments. In some embodiments, however, the scale (e.g., 12) is positioned on the vehicle (e.g., 20) such that the driver (e.g., 21), while driving the vehicle, can see the scale (e.g., 12) by opening a door of the vehicle (e.g., 20). Further, in various embodiments, the scale (e.g., 12, for example, shown in FIG. 1 on elongated member 10) is positioned (e.g., on vehicle 20) below the driver (e.g., 21, for instance, as shown in FIG. 2), and when the diver (e.g., 21) is driving the vehicle (e.g., 12), the stationary visual reference (e.g., 11) is located on the driving surface (e.g., 23). The driving surface (e.g., 23) may be a roadway (e.g., pavement) or the ground, as examples. Still further, in a number of embodiments, the driver (e.g., 21), for instance, while driving the vehicle (e.g., while driver 21 is located where shown in FIG. 2) can sight (e.g., along line of sight 22 shown) past the scale (e.g., scale 12 shown in FIG. 1 which is marked or printed on elongated member 10 shown in FIGS. 1 and 2) to the stationary visual reference (e.g., 11) on the driving surface (e.g., 23) to see how far the vehicle (e.g., 20) has moved. Even further, in particular embodiments, the apparatus includes the stationary visual reference (e.g., 11). For example, in some embodiments, the stationary visual reference (e.g., 11) is or includes an object (e.g., a rod), for example, carried on the vehicle (e.g., 20), for instance, that the driver (e.g., 21) places on the driving surface (e.g., 23) before using the apparatus (e.g., elongated member 10 and stationary visual reference 11) to see how far the vehicle (e.g., 20) has moved. In a number of embodiments, however, the driver may use [i.e., for the stationary visual reference (e.g., 11)] an existing marking (e.g., a painted line) or feature on the driving surface (e.g., 23) or an object that is locally available (e.g., a rock, stick, or piece of roadside debris).

In some embodiments, for example, the vehicle (e.g., 20) is a tractor (i.e., tractor unit), for instance, of a tractor-trailer rig. Further, in some embodiments, the apparatus (e.g., elongated member 10, in some embodiments including stationary visual reference 11) is used to measure how far to move the tractor (e.g., 20), for example, when sliding (e.g., tandem) axles of the trailer (e.g., semi-trailer, for instance, pulled by the tractor). Still further, in some embodiments, the indicia (e.g., described above, for example, of scale 12) are spaced a first distance apart. Double-headed arrow 16 shown in FIG. 1 illustrates an example of such a "first distance". Even further, in a number of embodiments, the trailer has slider rails with locking holes for locking the (e.g., tandem) axles and the locking holes are spaced a second distance apart. Slider rails with locking holes for locking axles in position are known in the art and may be, for example, 4 or 6 inches apart. Thus, this "second distance apart" may be 4 or 6 inches, as examples. In other cases, however, the "second distance apart" may be 2, 3, 5, 7, 8, 9, 10, or 12 inches, as other examples. Further still, in some embodiments, the second distance is a whole-number multiple of the first distance (e.g., 16 shown in FIG. 1). Even further still, in particular embodiments, the "whole number" is between 1 and 10, for example. In other embodiments, the "whole number" is between: 1 and 12; 2 and 12; 3 and 12; 4 and 12; 1 and 8; 2 and 8; 3 and 8; 4 and 8; 1 and 6; 2 and 6; 3 and 6; or 4 and 6, as other examples. For instance, in particular embodiments, the "whole number" is 1, 2, 3, 4, 5, 6, 8, 10, or 12, as examples. Even further, in certain embodiments, the "first distance" (e.g., 16 shown in FIG. 1) is 0.5, 1, 2, 3, 4, or 6 inches, as examples. In various embodiments, driver 21 may: determine the whole number, determine how many locking holes in the slider rails to move the (e.g., tandem) axles, and move the vehicle or tractor 20 the a number of indicia on scale 12 that is equal to the whole number for each locking hole in the slider rails to move the axles.

FIGS. 1 and 2 illustrate an example of an apparatus for measuring how far to move a tractor (e.g., 20) when sliding (e.g., tandem) axles of a trailer of a tractor-trailer rig, semi-tractor-trailer truck, big rig, or eighteen wheeler. In the embodiment shown, for example, the apparatus includes elongated member 10 that includes scale 12 (shown in FIG. 1) that includes multiple evenly-spaced indicia (e.g., as shown in FIG. 1 and described above), for example, arranged in a line (e.g., substantially parallel to double-headed arrow 13 shown in FIG. 1). As mentioned, in the embodiment illustrated, elongated member 10 has longest overall dimension 13, which may be is at least four times any overall dimension (e.g., 14 shown) of elongated member 10 that is perpendicular to longest overall dimension 13 of elongated member 10. Still further, in the embodiment shown, (e.g., when the apparatus is in use, for example, to measure distance moved), elongated member 10 is attached to tractor 20, and (e.g., at least when the apparatus is in use), elongated member 10 is positioned on tractor 20 where (e.g., as shown) driver 21, while driving tractor 20, can see the scale (e.g., 12 shown in FIG. 1 on elongated member 10) and can sight past the scale (e.g., along line of sight 22 shown in FIG. 2) to stationary visual reference 11 located outside tractor 20 to see how far tractor 20 has moved.

In some embodiments, elongated member 10 is provided (e.g., sold) separately from vehicle or tractor 20. Further, in particular embodiments, for example, the apparatus (e.g., that includes elongated member 10) further includes instructions to attach elongated member 10 to vehicle or tractor 20, for example, to attach elongated member 10 to step 15 on tractor 20 (e.g., as shown or described herein). Further, some embodiments include instructions to use the apparatus (e.g., to use elongated member 10, scale 12, stationary visual reference 11, or a combination thereof) to measure how far to move tractor 20, for example, when sliding the (e.g., tandem) axles of the trailer (i.e., the trailer pulled by tractor 20) of the tractor-trailer rig. In a number of embodiments, instructions may be provided with elongated member 10, when elongated member 10 is sold, or both. In some embodiments, however, instructions (e.g., described herein) may be included in advertising, for example, for elongated member 10. In certain embodiments, elongated member 10 is provided (e.g., sold) with vehicle or tractor 20, or the scale (e.g., similar to scale 12 or as described herein) may be marked or printed on vehicle or tractor 20, step 15, or a similar component. In some such embodiments, advertising, for example, as described herein, may also be provided.

Further still, in various such embodiments, elongated member 10 is positioned on tractor 20 such that driver 21, while driving tractor 20, can see the scale (e.g., 12, shown in FIG. 1, of elongated member 10, shown in FIGS. 1 and 2) by opening a door (e.g., the driver's door) of tractor 20. Certain embodiments may include instructions to position elongated member 10 on tractor 20 as such, as described herein, or a combination or sub-combination thereof.

In the embodiment shown (e.g., as shown in FIG. 2), elongated member 10 is positioned on tractor 20 below driver 21 (i.e., below driver 21 when diver 21 is driving tractor 20, as shown), stationary visual reference 11 is located on driving surface 23, and driver 21, while driving tractor 20, can sight (e.g., along line of sight 22) past the scale (i.e. scale 12 shown in FIG. 1 which is located on top of elongated member 10 shown in FIG. 2) to stationary visual reference 11 (shown in FIGS. 1 and 2) on driving surface 23 to see how far tractor 20 has moved. Even further, in certain embodiments, the apparatus includes stationary visual reference 11. For example, in particular embodiments, stationary visual reference 11 is or includes an object (e.g., a rod), for instance, carried on tractor 20, for example, that driver 21 places on driving surface 23 before using the apparatus (e.g., using scale 12, elongated member 10, or both) to see how far tractor 20 has moved. In some embodiments, for example, stationary visual reference 11 is provided (e.g., sold) with elongated member 10, for example, for use with tractor 20. Even further still, in certain embodiments, elongated member 10, the object (e.g., stationary visual reference 11), or both, are configured for (i.e., made specifically for) the object (e.g., stationary visual reference 11) to be carried on tractor 20 within elongated member 10. In some embodiments, for instance, elongated member 10 may be hollow or tubular. For example, in certain embodiments, elongated member 10 is (e.g., square) tubular metal, for example, steel, stainless steel, brass, copper, or aluminum. In other embodiments, elongated member 10 may be plastic, for example, selected to resist ultraviolet degradation from sunlight. In various embodiments, elongated member 10 may be corrosion resistant. Further, in some embodiments, the object (e.g., stationary visual reference 11) may be sized, shaped, or both, to fit within elongated member 10. Further still, in some embodiments, the object (e.g., stationary visual reference 11) may be shaped or designed to avoid rolling, to avoid blowing away in wind, or both. In some embodiments, the object (e.g., stationary visual reference 11) may be non-circular, flat, or triangular, as examples. In some embodiments, for example, the object (e.g., stationary visual reference 11) may be plastic.

Other embodiments include an apparatus or method of obtaining or providing an apparatus or information, for instance, that include a novel combination of the features described herein. Even further embodiments include at least one means for accomplishing at least one functional aspect described herein. The subject matter described herein includes various means for accomplishing the various functions or acts described herein or that are apparent from the structure and acts described. Each function described herein is also contemplated as a means for accomplishing that function, or where appropriate, as a step for accomplishing that function. Moreover, various embodiments include certain (e.g., combinations of) aspects described herein. All novel combinations are potential embodiments. Some embodiments may include a subset of elements described herein and various embodiments include additional elements as well.

Further, various embodiments of the subject matter described herein include various combinations of the acts, structure, components, and features described herein, shown in the drawings, described in any documents that are incorporated by reference herein, or that are known in the art. Moreover, certain procedures can include acts such as manufacturing, obtaining, or providing components that perform functions described herein or in the documents that are incorporated by reference. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. An apparatus for measuring distance when moving a vehicle in a forward or reverse direction, the apparatus comprising a scale that is mounted on the vehicle while the apparatus is in use; the scale comprising multiple evenly-spaced indicia arranged in a line; wherein when the apparatus is in use, the line is substantially parallel to the forward or reverse direction of the vehicle when the vehicle is traveling in a straight line; and wherein the scale is positioned on the vehicle where the driver, while driving the vehicle, can see the scale and can sight past the scale to a stationary visual reference located outside the vehicle to see how far the vehicle has moved.

2. The apparatus of claim 1 wherein, when the apparatus is in use, the scale is located on a step of the vehicle below the driver.

3. The apparatus of claim 1 wherein:
the apparatus comprises an elongated member;
the scale is located on the elongated member;
when the apparatus is in use, the elongated member is attached to the vehicle;
the elongated member has a longest overall dimension of the elongated member;
the longest overall dimension of the elongated member is at least four times any overall dimension of the elongated member that is perpendicular to the longest overall dimension of the elongated member;
when the apparatus is in use, the longest overall dimension of the elongated member is substantially parallel to the forward or reverse direction of the vehicle when the vehicle is traveling in a straight line.

4. The apparatus of claim 3 wherein, when the apparatus is in use, the elongated member is attached to a step of the vehicle below the driver.

5. The apparatus of claim 3 wherein the longest overall dimension of the elongated member is at least ten times any overall dimension of the elongated member that is perpendicular to the longest overall dimension of the elongated member.

6. The apparatus of claim 1 wherein the scale is positioned on the vehicle such that the driver, while driving the vehicle, can see the scale through a side window of the vehicle.

7. The apparatus of claim 1 wherein the scale is positioned on the vehicle such that the driver, while driving the vehicle, can see the scale by opening a door of the vehicle.

8. The apparatus of claim 1 wherein the scale is positioned on the vehicle below the driver when the diver is driving the vehicle, the stationary visual reference is located on the driving surface, and the driver, while driving the vehicle, can sight past the scale to the stationary visual reference on the driving surface to see how far the vehicle has moved.

9. The apparatus of claim 8 further comprising the stationary visual reference wherein the stationary visual reference comprises an object carried on the vehicle that the driver places on the driving surface before using the apparatus to see how far the vehicle has moved.

10. The apparatus of claim 1 wherein the vehicle is a tractor of a tractor-trailer rig and the apparatus is used to measure how far to move the tractor when sliding axles of the trailer.

11. The apparatus of claim 10 wherein: the indicia are spaced a first distance apart; the trailer has slider rails with locking holes for locking the axles; the locking holes are spaced a second distance apart; the second distance is a whole-number multiple of the first distance, and the whole number is between 1 and 10.

12. An apparatus for measuring how far to move a tractor when sliding axles of a trailer of a tractor-trailer rig, the apparatus comprising an elongated member comprising a scale comprising multiple evenly-spaced indicia arranged in a line; wherein: the elongated member has a longest overall dimension of the elongated member; the longest overall dimension of the elongated member is at least four times any overall dimension of the elongated member that is perpendicular to the longest overall dimension of the elongated member; when the apparatus is in use, the elongated member is attached to the tractor; and when the apparatus is in use, the elongated member is positioned on the tractor where the driver, while driving the tractor, can see the scale and can sight past the scale to a stationary visual reference located outside the tractor to see how far the tractor has moved.

13. The apparatus of claim 12 further comprising instructions to attach the elongated member to the tractor.

14. The apparatus of claim 12 further comprising instructions to attach the elongated member to a step on the tractor.

15. The apparatus of claim 12 further comprising instructions to use the apparatus to measure how far to move the tractor when sliding the axles of the trailer of the tractor-trailer rig.

16. The apparatus of claim 15 further comprising instructions to attach the elongated member to a step on the tractor.

17. The apparatus of claim 12 wherein the elongated member is positioned on the tractor such that the driver, while driving the tractor, can see the scale by opening a door of the tractor.

18. The apparatus of claim 12 wherein the elongated member is positioned on the tractor below the driver when the diver is driving the tractor, the stationary visual reference is located on the driving surface, and the driver, while driving the tractor, can sight past the scale to the stationary visual reference on the driving surface to see how far the tractor has moved.

19. The apparatus of claim 18 further comprising the stationary visual reference wherein the stationary visual reference comprises an object carried on the tractor that the driver places on the driving surface before using the apparatus to see how far the tractor has moved.

20. The apparatus of claim 19 wherein the elongated member and the object are configured for the object to be carried on the tractor within the elongated member.

\* \* \* \* \*